(12) United States Patent
Milne et al.

(10) Patent No.: US 12,442,426 B2
(45) Date of Patent: Oct. 14, 2025

(54) SPRING

(71) Applicant: Balmoral Comtec Limited, Aberdeen (GB)

(72) Inventors: Fraser James Milne, Brechin (GB); William Henry Lannagan, Aberdeen (GB)

(73) Assignee: Balmoral Comtec Limited, Aberdeen (GB)

( * ) Notice: Subject to any disclaimer, the term of this patent is extended or adjusted under 35 U.S.C. 154(b) by 453 days.

(21) Appl. No.: 17/792,200

(22) PCT Filed: Jan. 22, 2021

(86) PCT No.: PCT/GB2021/050146
§ 371 (c)(1),
(2) Date: Jul. 12, 2022

(87) PCT Pub. No.: WO2021/148802
PCT Pub. Date: Jul. 29, 2021

(65) Prior Publication Data
US 2023/0045865 A1 Feb. 16, 2023

(30) Foreign Application Priority Data
Jan. 22, 2020 (GB) .................................... 2000944

(51) Int. Cl.
*F16F 1/376* (2006.01)
*F16F 1/377* (2006.01)
(Continued)

(52) U.S. Cl.
CPC .............. *F16F 1/376* (2013.01); *F16F 1/377* (2013.01); *F16L 3/10* (2013.01); *E21B 17/012* (2013.01);
(Continued)

(58) Field of Classification Search
CPC .... F16F 1/376; F16F 1/377; F16F 2224/0241; F16F 2224/025; F16F 2228/066;
(Continued)

(56) References Cited

U.S. PATENT DOCUMENTS 2,900,698 A * 8/1959 Zartler .................... F16L 33/04
24/279
3,848,638 A * 11/1974 Huslander ............. F16L 55/172
24/279
(Continued)

FOREIGN PATENT DOCUMENTS

GB 2103272 A 2/1983
GB 2391255 A 2/2004
(Continued)

OTHER PUBLICATIONS

PCT/GB2021/050146 International Search Report and Written Opinion of the International Searching Authority dated Mar. 16, 2021 (10 pages).
(Continued)

Primary Examiner — Thomas W Irvin
(74) Attorney, Agent, or Firm — Amundsen Davis, LLC (57) ABSTRACT

A spring (5;105;205;305;404;505) for a clamp suitable for attachment to a tubular member, the spring comprising a resilient body (6;106;206;306;406;506) having first and second ends (8;108;208;308;408;508) and an internal surface (7;107;207;307;407;507) adapted to seat within a clamp member and an external surface (9;109;209;309;409;509) adapted to contact the outer surface of a tubular member, the internal and external surfaces extending between the first and second ends and wherein the stiffness of the resilient body of the spring varies over the length of the body between the first and second ends.

19 Claims, 7 Drawing Sheets

(51) Int. Cl.
   *F16L 3/10* (2006.01)
   *E21B 17/01* (2006.01)
   *F16L 1/24* (2006.01)

(52) U.S. Cl.
   CPC .. *F16F 2224/0241* (2013.01); *F16F 2224/025* (2013.01); *F16F 2228/066* (2013.01); *F16F 2230/02* (2013.01); *F16F 2230/36* (2013.01); *F16L 1/24* (2013.01)

(58) Field of Classification Search
   CPC ..... F16F 2230/02; F16F 2230/36; F16L 3/10; F16L 1/24; F16L 55/172; E21B 17/012
   See application file for complete search history.

(56) References Cited

U.S. PATENT DOCUMENTS

| | | | | |
|---|---|---|---|---|
| 3,877,733 A * | 4/1975 | Straub | ............... | F16L 21/08 285/112 |
| 4,365,393 A * | 12/1982 | Hauffe | ............... | F16L 55/172 285/373 |
| 4,381,020 A * | 4/1983 | Daghe | ............... | F16L 21/005 24/279 |
| 4,409,708 A * | 10/1983 | Hauffe | ............... | F16L 55/172 285/373 |
| 4,606,377 A * | 8/1986 | Montgomery | ......... | F16L 55/18 138/99 |
| 4,664,422 A * | 5/1987 | Straub | ............... | F16L 21/005 285/112 |
| 4,889,167 A * | 12/1989 | Morris | ............... | F16L 55/172 138/110 |
| 5,203,594 A * | 4/1993 | Straub | ............... | F16L 17/04 285/112 |
| 6,293,556 B1 * | 9/2001 | Krausz | ............... | F16L 17/04 285/369 |
| 7,232,160 B2 * | 6/2007 | Krausz | ............... | F16J 15/106 285/15 |
| 7,749,035 B2 * | 7/2010 | Oram | ............... | E21B 17/012 441/133 |
| 7,887,260 B2 * | 2/2011 | Courbis | ............... | F16F 1/377 405/212 |
| 9,428,969 B2 * | 8/2016 | Harbison | ............... | F16B 2/08 |
| 9,945,508 B2 * | 4/2018 | Espinasse | ............ | F16L 59/141 |
| 11,473,563 B2 * | 10/2022 | Van Hinsbergh | ....... | E02B 17/00 |
| 2008/0286052 A1 * | 11/2008 | Courbis | ............... | E21B 17/017 405/184.4 |
| 2014/0000743 A1 * | 1/2014 | Biery | ............... | F16L 55/172 138/99 |
| 2015/0068759 A1 * | 3/2015 | Harbison | ............... | E21B 17/012 166/350 |
| 2019/0249648 A1 * | 8/2019 | Van Hinsbergh | ....... | F03D 13/25 |
| 2022/0034435 A1 * | 2/2022 | Webb | ............... | F16L 21/065 |
| 2023/0235805 A1 * | 7/2023 | Spatzig | ............... | F16F 1/387 267/141 |

FOREIGN PATENT DOCUMENTS

| | | |
|---|---|---|
| GB | 2459553 A | 11/2009 |
| WO | 2013/113316 A1 | 8/2013 |
| WO | 2013/171521 A2 | 11/2013 |
| WO | 2017/037417 A1 | 3/2017 |
| WO | 2019/030541 A1 | 2/2019 |

OTHER PUBLICATIONS

Preliminary Report on Patentability for Application No. PCT/GB2021/050146 dated Aug. 4, 2022 (12 pages).
GB2100867.7 Combined Search and Examination Report under Sections 17 & 18(3) dated Jul. 12, 2021 (2 pages).

* cited by examiner

SPRING

This invention relates to a spring and more specifically a radial load spring for use in a clamp device for securing buoyancy elements and particularly distributed buoyancy elements underwater tubular members such as flowlines, risers and umbilicals.

Oil and gas is carried from reservoirs beneath the seabed to the surface by rigid or flexible tubular members such as pipes which are typically known as risers. The outer diameter of a riser is subject to significant tolerances due to manufacturing specifications, tension in the riser, internal pressure, hydrostatic pressure and the temperature of the fluids which flow therein. Therefore, the outer diameter of a riser is subject to change along its length due to amongst other things, the hydrostatic pressure of the water surrounding the riser and also the temperature and pressure of the recovered fluids flowing within the riser.

The weight of the riser together with hydrocarbons flowing there through may be supported from the surface facility in shallow waters but this requires strong risers and connections to maintain the integrity of a long string of risers which mat extend over many hundreds of meters. It is therefore more economic to attach buoyancy elements to the risers to provide additional support.

Distributed buoyancy modules are provided upon risers to isolate subsea termination from the effects of vessel movement under weather and tide conditions or in order to maintain the riser in the required position for optimum use. For example, known configurations of riser between a Floating Production Storage and Offtake (FPSO) vessel and the seabed or floating subsea structure include configurations termed as "Lazy S", "Lazy wave", "Lazy W" amongst others.

Clamps can be used to fit around the riser and provide a mounting for a buoyancy module. Alternatively, the clamp may be an integral component of the buoyancy module. However, the attachment of the clamp to the riser must be done carefully in order to avoid any damage to the riser which could lead to failure of the flowline or failure to correctly attach and position the buoyancy module.

The changes in internal and external pressure and temperature of the riser as described above, can result in significant variance in the outer diameter of the riser and therefore can affect its connection to a clamp. This can cause the clamp to slip along the outer surface of the riser. This can change the position of the buoyancy module which may result in a change to the configuration of the riser away from the intended position. Moreover, the bending and tensile strains which occur in risers in use further hinder the correct dimensioning of rigid clamps.

Known buoyancy modules include arcuate or C-shaped shell members which have a semi-circular channel extending the full length of the shell members and provided within the internal surface which corresponds dimensionally to the outer surface of the riser. A plurality of such members are positioned around the riser and secured in position with a tensioned band such as a titanium strap or a band of aramid fibres such as KEVLAR or TWARON to provide a clamp to which a buoyancy module can be secured.

An internal circumferential recess may be formed within the semi-circular channel of the shell members within which a clamping component is mounted. The clamping component may be integral with the buoyant shell member or may be separately formed and seated within the recess.

Figure 1:
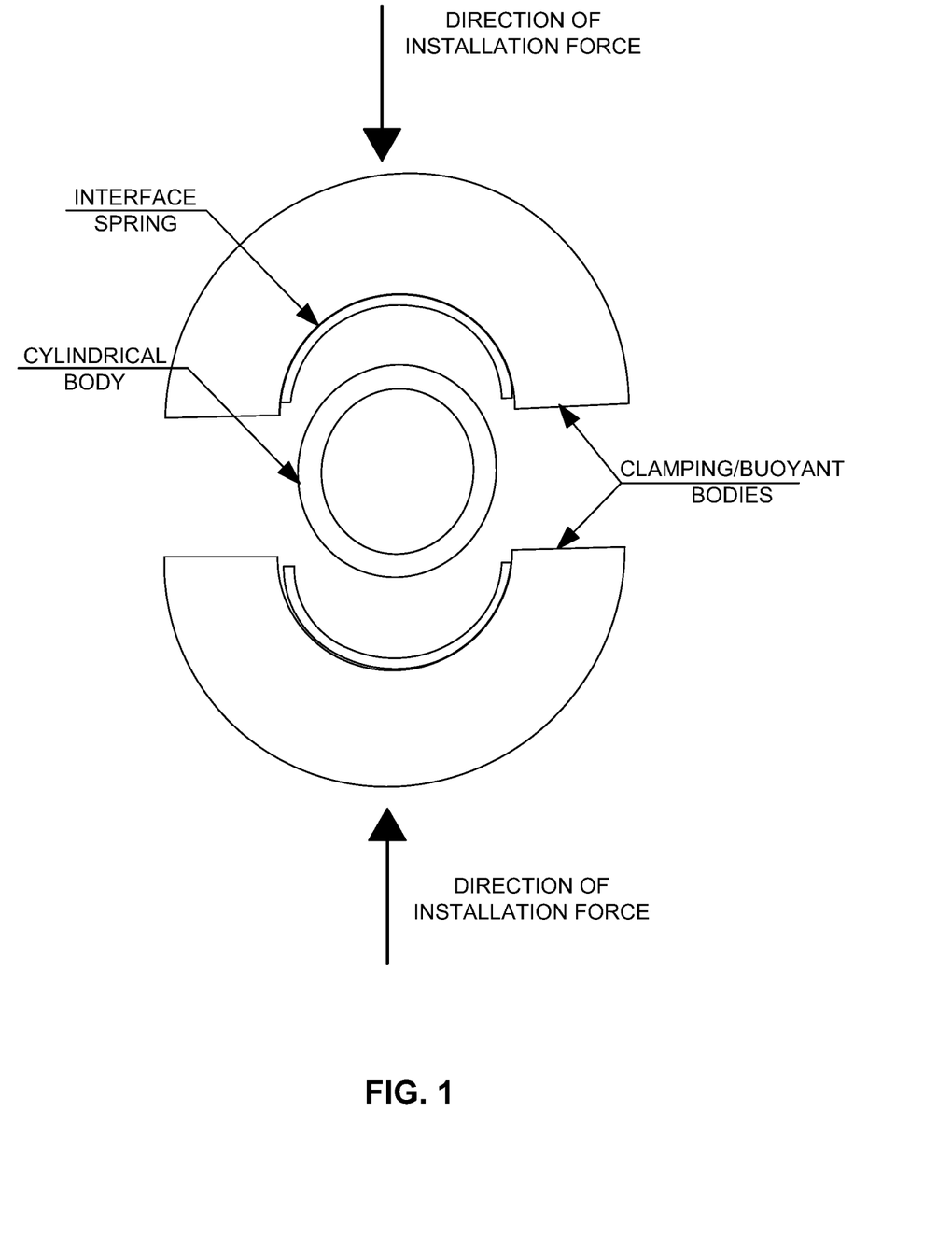
FIG. 1 is a perspective view of a buoyancy module incorporating a known bi-directional loaded spring.

For example, a bi-directional loaded buoyancy module is shown in FIG. 1 which uses 2 semi-annular shell members each of which has an internal semi-circular channel in the inner face of the module such that two modules, when brought together along their inner faces, will surround a tubular member.

In this embodiment, the clamping component comprises a spring mounted in a circumferential recess in the semi-circular channel. In some known designs, a plurality of resilient springs in the form of rectangular or cuboid blocks are arranged in a centrally located array with two rows of three blocks around the circumferential recess in the semi-circular channel. As the two buoyancy modules are brought together around a tubular member, the outer surface of the springs contact the tubular member at different points around the outer circumference of the tubular member provide a resilient cushion between the buoyancy module and the outer surface of the riser and to distribute load and subsequent contact pressure from the buoyancy module around the tubular member.

The number of shell members and corresponding clamping components of a buoyancy module may typically be between 2 and 4, although buoyancy modules and clamps can be formed with a greater number of members if required.

Performance limitations are constantly being challenged with demands for clamps to cope with larger buoyancy loads and deployment in rougher sea states, and to accommodate larger riser strains and tighter riser bend radii and high rates of change of these radii as the riser or other tubular member expands and contracts under operating conditions.

Typically, as the number of clamping components reduces, the distribution of applied radial load around the outer surface of the riser will change. Reducing the number of clamping components means that the springs of each clamping component extends by a greater distance around the outer curved surface of the riser and this can lead to an uneven force and pressure distribution about the circumference of the tubular member. In an extreme case, particularly when a two component buoyancy module and clamp is deployed, this can lead to a higher force being applied towards the centre of the clamping component of the buoyancy module than at the outer ends. This could in theory lead to the pipe being crushed at the centre of the clamping segment and bulging at the outer ends which could lead to collapse of the riser.

Whilst the known clamp provides a significant advantage over previously known tools in mitigating against the capstan effect and evening out the loads applied and experienced by individual components of the clamp, the applicant has developed a modified clamp which further mitigates the aforementioned effects.

It is therefore an object of the present invention to provide an improved spring for a clamping component of a buoyancy module which overcomes or at least mitigates the problems described above.

The present invention therefore aims to provide a clamp for mounting buoyancy modules onto tubular members which overcomes or at least mitigates the problems set out above.

It is a further object of the present invention to provide a buoyancy module which can be formed of a number of circumferentially offset members clamped around a tubular member such as a riser to provide the required buoyancy to maintain a given riser configuration.

According to a first aspect of the present invention there is provided a spring for a clamp suitable for attachment to a tubular member, the spring comprising a resilient body having first and second ends and an internal surface adapted to seat within a clamp member and an external surface adapted to contact the outer surface of a tubular member, the internal and external surfaces extending between the first and second ends and wherein the stiffness of the resilient body of the spring varies over the length of the body between the first and second ends.

Optionally, the body of the spring is arcuate.

Optionally the stiffness is higher towards the first and second ends of the resilient body than in the centre of the body.

Optionally also the stiffness of the body varies gradually from the first and second ends towards the centre of the body.

Optionally the outer surface of the body is undulating in form.

Optionally this may take the form of a plurality of projections or undulations with peaks or crests and troughs along the outer surface of the spring.

Conveniently the crests on the outer surface of the spring may each have the same height from the adjacent trough.

Alternatively, the height of the crests on the outer surface of the spring relative to the adjacent tough may be different.

In one embodiment the height of the crests on the outer surface of the spring closest to the centre of the spring relative to the adjacent toughs may be higher than the height of the crests closer to the first and second ends of the spring relative to the adjacent troughs.

Alternatively the height of the crests on the outer surface closest to the centre of the spring relative to the adjacent troughs may be smaller than the height of the crests closer to the first and second ends of the spring relative to the adjacent troughs.

Alternatively, voids are formed in the body to vary the stiffness of the body along the length of the body.

Conveniently the voids may have different volumes and or shapes over the length of the spring between the first and second ends.

Conveniently the voids adjacent the first and second ends of the spring may be smaller in volume and or size than the voids closer to the centre of the spring.

Optionally the resilient body comprises rubber which may in some embodiments be a nitrile rubber.

Optionally or alternatively the resilient body comprises polyurethane.

Optionally or alternatively the resilient body comprises fibre re-enforced plastics.

According to a second aspect of the present invention there is provided a clamp component for attachment to a tubular member, the clamp component comprising a housing and a spring according to the first aspect of the present invention mounted within a seat on an inner face of the housing.

Advantageously, the clamp body comprises a plurality of clamp components, each of which has housing and a spring member mounted thereon.

Optionally, the clamp may have 2, 3, 4 or some other number of clamp components.

According to a third aspect of the present invention there is provided a clamp comprising a plurality of clamp components according to the second aspect of the invention and tensioning means for securing said components around a tubular member.

Preferably the tensioning means comprises a band surrounding the clamp.

Embodiments of the present invention will now be described by way of example only with reference to the accompanying drawings in which:—

FIG. 7b is an enlarged detail view of part of the spring of FIG. 7a Turning now to the drawings, a first embodiment of the present invention is shown in FIG. 2a. This shows a cross-sectional view through a segment of a component of a clamp for mounting a buoyancy module around the outer circumference of a tubular member such as a riser, pipe, umbilical or the like.

Figure 2A:
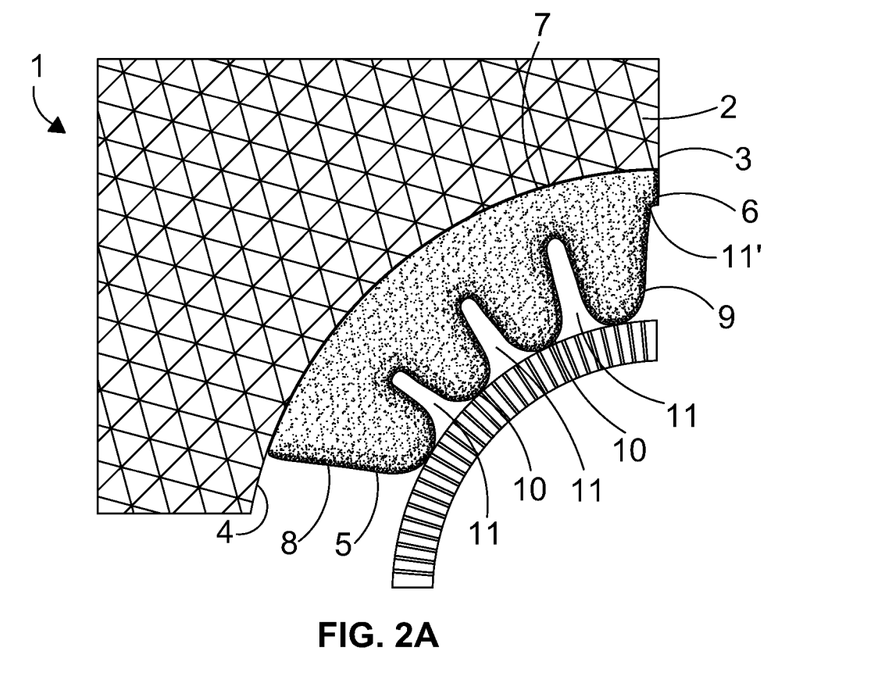
FIG. 2a is a schematic view of a clamp spring of a first embodiment of the present invention as the spring is brought into contact with a tubular member.

The clamp component 1 comprises a housing 2 adapted to mount around the outer surface of a tubular member. In the embodiment shown, the clamp has a second similarly shaped component, each with a semi-circular channel 3 extending along the internal surface from the top surface of the component to the bottom surface of the component.

When the two clamp components brought together around the tubular member, the clamp will surround the tubular member which will be held within the channel through the clamp.

The surface of the semi-circular channel 3 of the housing acts as a seat 4 for a spring 5 to absorb the forces when the clamp is secured around the outer surface of the tubular member.

The spring comprises a resilient body 6 which has an arcuate form when mounted on the housing of the clamp. The body 6 is preferably formed of a material such as rubber, nitrile rubber, polyurethane, fibre re-enforced plastics or combinations thereof. This allows the resilient body to absorb forces as the clamp component is forced against the outer surface of the tubular member and the resilient body is squeezed between the clamp housing and the outer surface of the tubular member.

The inner surface 7 of the resilient body 6 is adapted to be mounted within the seat 4 of the housing. In the illustrated embodiment the seat 4 is provided by the arcuate surface of the semi-circular channel. The spring may be mounted at a position equidistant between the upper and lower ends of the housing although in some embodiments the spring may extend fully between the top surface and lower surface of the housing. Alternatively, in some embodiments the position of the spring between the upper and lower ends of the housing may be modified if required.

The spring extends from a position adjacent one end of the semi-circular channel 3 to a position adjacent the other end of the semi-circular channel. As can be seen in FIG. 2a, the spring is mounted adjacent to but spaced from the start of the semi-circular channel. Therefore, the spring has a length which is slightly less than the length of the concave arcuate surface of the semi-circular channel 3 of the housing 4.

The outer ends 8 of the resilient body 6 in the embodiment illustrated (only 1 of which is shown) are tapered inwards towards the centre of the semi-circular channel 3 and the length of the outer surface of the resilient body 6 is shorter than the length of the inner surface of the body. The performance of the spring may be tuned by altering the taper angle of the ends of the spring.

In the embodiment shown, the stiffness of the resilient body 6 of the spring varies along the length of the body from one end to the other. In this embodiment, the outer surface 9 of the resilient body has an undulating form with rounded peaks 10 separated by troughs 11. The thickness of the resilient body 6 from the inner surface 7 to the outer surface 9 at the peaks 10 is greater than the thickness from the inner surface 7 to the outer surface 9 at the troughs 11 of the spring. Furthermore, the width of each individual peak increases from the central peak towards the outer peaks at the ends of the spring. The stiffness of the spring in the regions of the peaks is greater than the stiffness of the spring in the regions of the troughs and therefore the stiffness of the spring is higher at the ends than in the centre of the spring.

In the illustrated embodiment, the depth of the first tough 11 closest to the outer end 8 of the resilient body is less than the depth of the trough 11' at the centre of the resilient body. The depth of the troughs 11 in this embodiment gradually increase between the extreme outermost troughs and the centre trough. In alternative embodiments the depth of the troughs may be equal along the length of the body.

By forming the resilient body with an undulating outer surface as shown, fingers are formed in the body 6 which provide greater flexibility in the body than a solid block of resilient material as described in prior art clamps.

Figure 2B:
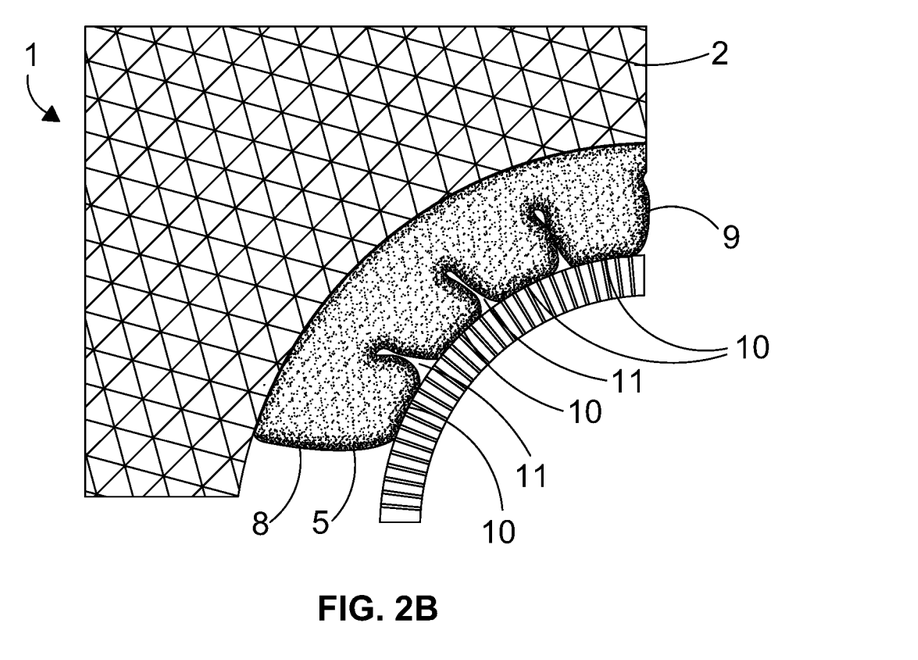
FIG. 2b shows the deformation of the spring as load is applied.

As the clamp components 1 are initially brought together around the outer surface of a tubular member as shown in FIG. 2b, the peaks 10 on the outer surface 9 of the resilient body of the spring contact the outer circumference of the tubular member. As the components of the clamp are pushed against the outer surface of the tubular member, the resilient body 6 is compressed between the housing 2 of the clamp component and the outer surface of the tubular member. The fingers of the spring are compressed and pulled around the outer surface of the tubular member. As shown in FIG. 2, the rounded peaks 10 of the outer surface spread outwardly into the troughs 11 substantially closing the troughs. This ensures that the circumferential length of the interface between the clamp spring and the outer surface of the tubular member is greater than currently available with prior art springs and also provides homogenised distribution of pressure within the spring from the centre to the outer ends 8 which prevents abnormal deformation of the tubular member as the clamp components are tightened.

Therefore, the spring 5 of the clamp component shown in FIGS. 2a and 2b provides improved performance over currently known springs. In the embodiment described, the clamp component is intended to be mounted onto the outer surface of a tubular member in order to provide for an anchor point for a buoyancy module around the tubular member. Alternatively, the clamp component may be integrally formed within the buoyancy module and the housing 2 of the clamp component may be a C-shaped buoyancy shell member for example in a bi-directional loaded module or alternatively may be an arcuate shell segment intended to form part of a multi-segment buoyancy module as known in the industry.

Whilst the embodiment described above of the present invention is considered to provide significant advantages over known springs and clamping components, alternative embodiments are also envisaged that provide similar or further improved operational characteristics over known designs.

Figure 3A:
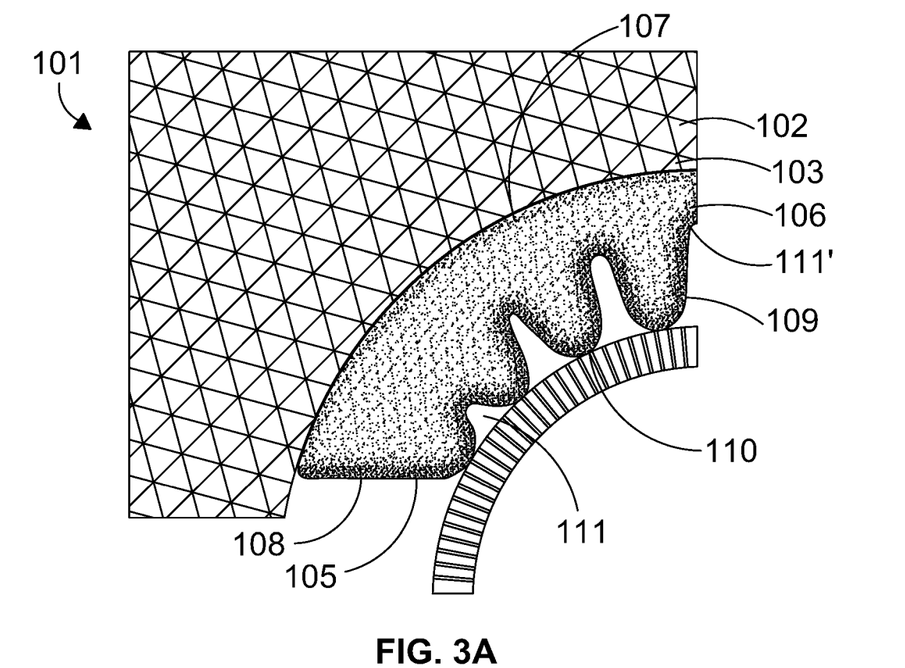
FIGS. 3a and 3b are schematic views of a further embodiment of the present invention with the deformation of the spring as load is applied shown in 3b.
Figure 3B:
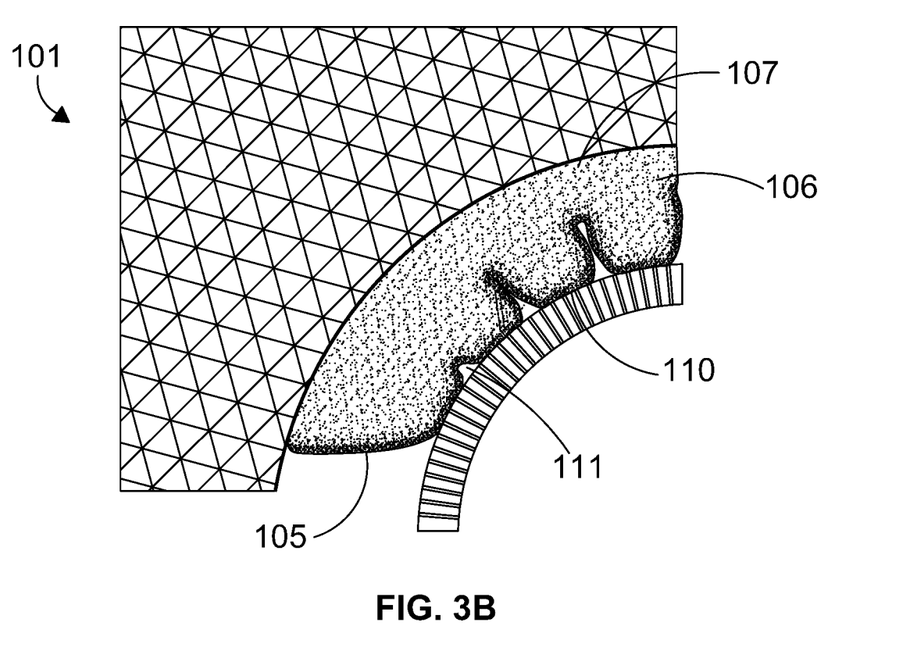

A further embodiment of the invention is illustrated in FIGS. 3a and 3b. In this embodiment the reference numerals are increased by a factor of 100 for ease of reference. In this embodiment the housing 102 of the clamp component is as described in the earlier embodiment.

The outer surface 109 in this embodiment is modified such that rather than a gradual increase in the depth of the troughs, the depth of the troughs 111 increase from the outer trough which is relatively shallow to the central trough 111' which is significantly deeper. Therefore, the thickness of the resilient body 106 towards the ends 108 of the body is greater than the thickness in the centre of the body and as a consequence, the stiffness of the resilient body 106 varies along the length of the body between the outer ends 108 such that the stiffness is greater towards the ends of the body than at the centre of the body.

Furthermore, in this embodiment, the outer ends 108 of the resilient body 106 are modified such that while the outer ends still taper towards the centre of the clamp component, in this embodiment the outer ends of the body extend in a plane parallel to the outer ends of the clamp housing 102 beyond the ends of the semi-circular channel 103.

As shown in FIG. 3b, as the clamp component 101 is pushed against the outer surface of the tubular member, the fingers of the spring 105 are pushed together and the inner surface 107 of the body 106 is pulled around the outer circumference of the tubular member thus spreading the load within the resilient body 106 along the length of the body.

The angle by which the ends of the body are tapered may be altered in order to tune the performance of the spring. Altering the taper angle allows for control of the angular position of the shoulder 112 when the spring is at rest, i.e. before the outer surface 109 is brought into contact with the outer surface of the tubular member, and the subsequent angular position of the shoulder (relative to the centre of the tubular member) when the spring is under loading i.e. when the spring is compressed between the housing and the tubular member.

Figure 4A:
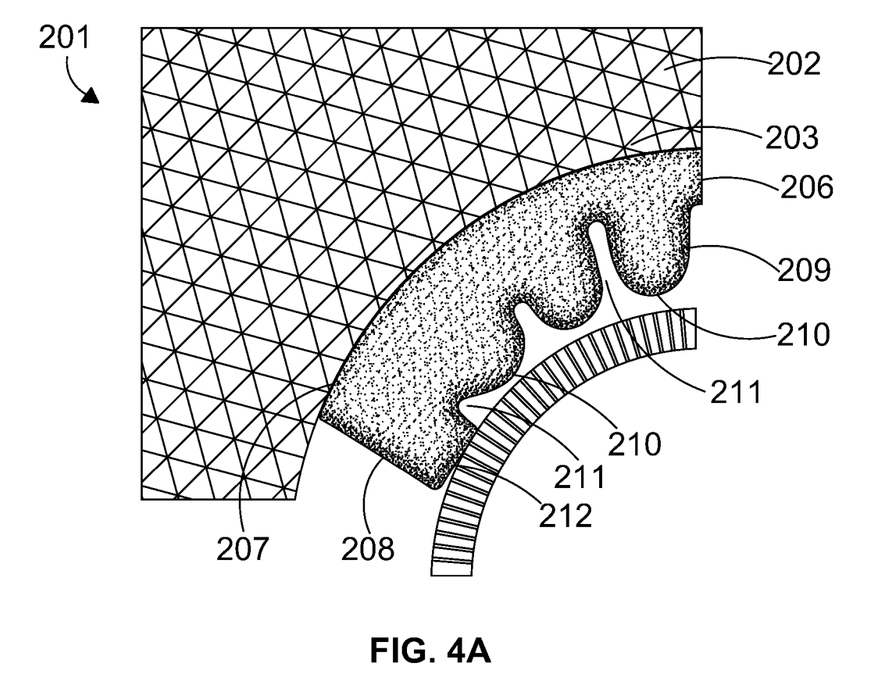
FIGS. 4a and 4b re schematic views of a still further embodiment of the present invention with the deformation of the spring as load is applied shown in 4b.
Figure 4B:
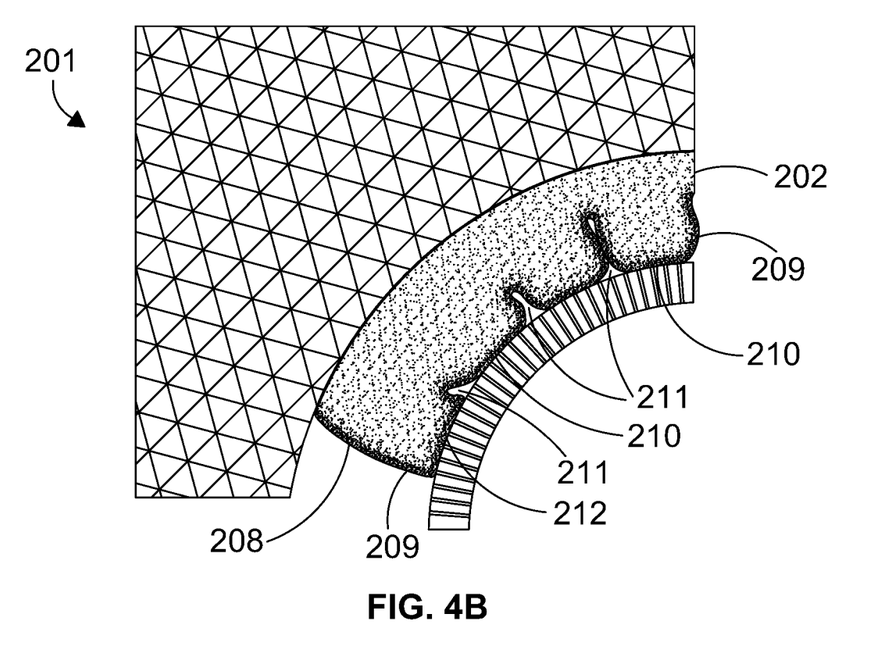

A still further embodiment of the invention is illustrated in FIGS. 4a and 4b. In this embodiment the reference numerals are increased by a factor of 200 for ease of reference. In this embodiment the housing 202 of the clamp component 201 is as described in the earlier embodiment.

In this embodiment the outer ends 208 of the resilient body form a substantial right angle with the end of the inner surface 207 and the outermost peak in the outer surface 209 is replaced by a flat shoulder portion 212. Rounded peaks 210 separated by troughs 211 are formed in the outer surface between the two flat shoulder portions 212 at either end of the resilient body 206. In this embodiment, a trough is formed between the inner end of the flat shoulder 212 and the outermost peak 210 which is relatively shallow and the troughs increase in depth between the outermost trough and the centre of the resilient body.

As shown in FIG. 4b, as the spring is compressed between the housing 202 and the outer surface of the tubular member, the flat shoulder 212 at the ends of the outer surface 209 of the resilient body contacts the outer surface of the tubular member and provides a region of increased friction between the resilient body and the outer surface of the tubular member. Due to the variation in stiffness of the resilient body caused by the variation in depth of the body at different points along its length, the loading and pressure distribution from the middle of the resilient body towards the outer ends 208 is improved over the prior art springs.

Figure 5A:
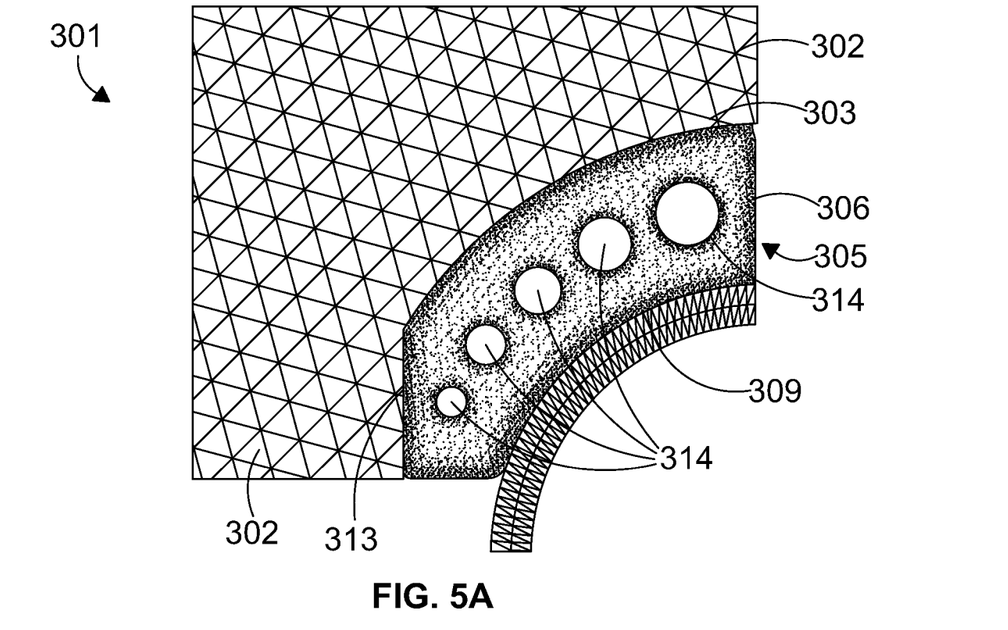
FIGS. 5a and 5b are schematic views of a further alternative embodiment of the present invention, with the deformation of the spring as load is applied shown in 5b.
Figure 5B:
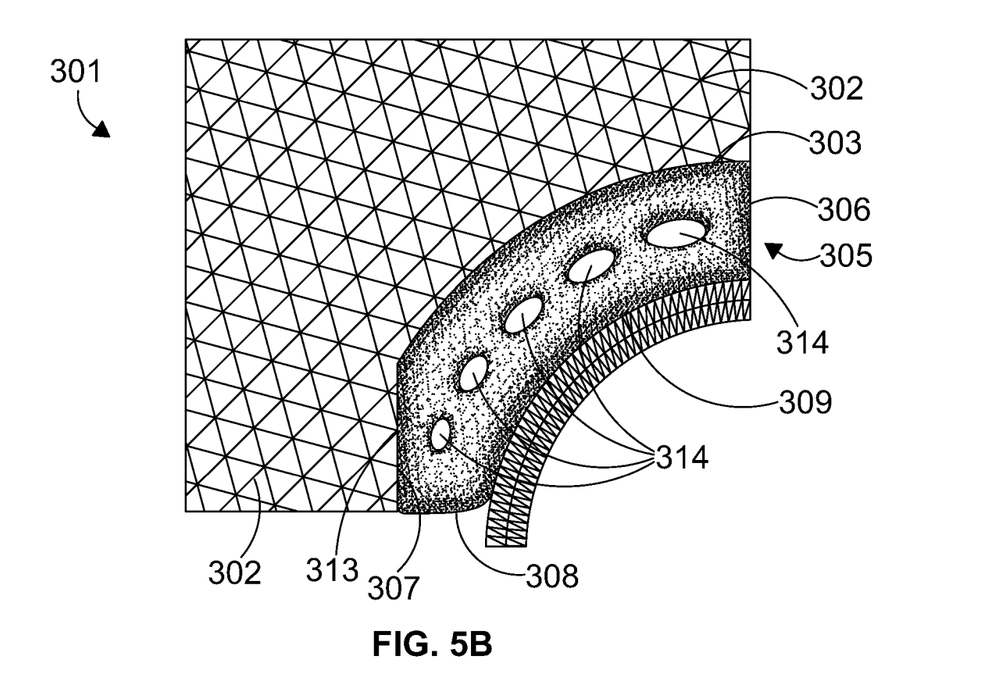

A further embodiment of the present invention is illustrated in FIGS. 5a and 5b of the drawings. In this embodiment, the reference numerals are increased by a factor of 300 for ease of reference. In this embodiment the housing 302 of the clamp component 301 is modified such that the outer ends of the surface of the semi-circular channel 303 terminate in straight portions 313 extending perpendicular to the outer ends of the clamp housing. The inner surface 307 of the resilient body 306 is modified to match at each of the outer ends 308 such that a right angled internal shoulder is formed between the straight portion of the housing 313 and the end of the resilient body. Thus in this embodiment the outer ends 308 of the resilient body extend within the same plane as the outer ends of the housing and form a continuation of the outer ends of the housing.

The spring 305 is further modified in this embodiment in that the undulations in the outer surface 309 are replaced by voids 314 encapsulated within the body 306 of the spring. In the embodiment illustrated the voids are substantially circular and extend through the resilient body from the upper surface to the lower surface. In some non-illustrated embodiments, the voids may have different shapes or may not extend through the body from the upper to the lower surface but may be fully encapsulated within the resilient body. The volume of the voids gradually increases along the length of the body from the outermost void within the end of the body to the void at the centre of the body.

As shown in FIG. 5b, as the clamp component 301 is compressed between the housing 302 and the outer surface of the tubular member, the voids 314 within the body of the spring 305 allow the spring to deform in a controlled manner and loading and pressure distribution over the length of the spring is improved over prior art springs. This embodiment provides a further improvement in that the contact interface between the spring 305 and the outer surface of the tubular member extends over the whole outer surface 309 of the body.

The diameter and spacing of the voids 314 placed within the spring can be modified so that stiffness of the spring is tailored or tuned to ensure that the natural peak load and pressure in the centre of the spring is reduced due to high compression areas that are coincident with the larger voids as they compress. Towards the ends of the spring, the diameter of the voids is progressively reduced or they may in some embodiments be removed altogether to create low compression areas (when compared to the regions of the spring with large diameter voids) which are coincident with the smaller diameter or lack altogether of voids.

Figure 6A:
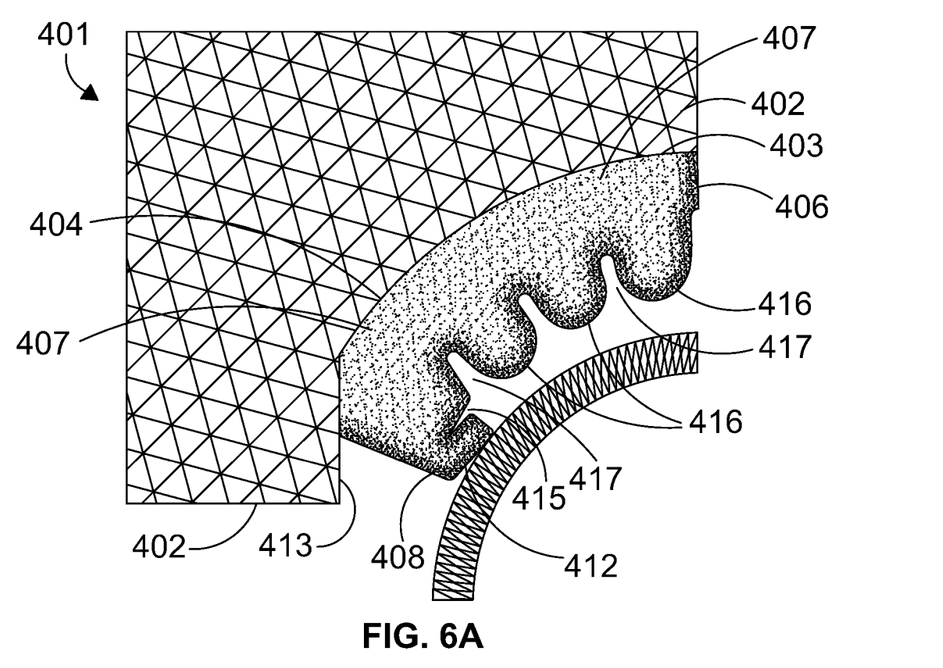
FIGS. 6a and 6b are schematic views of a still further alternative embodiment of the present invention with the deformation of the spring as load is applied shown in 6b.
Figure 6B:
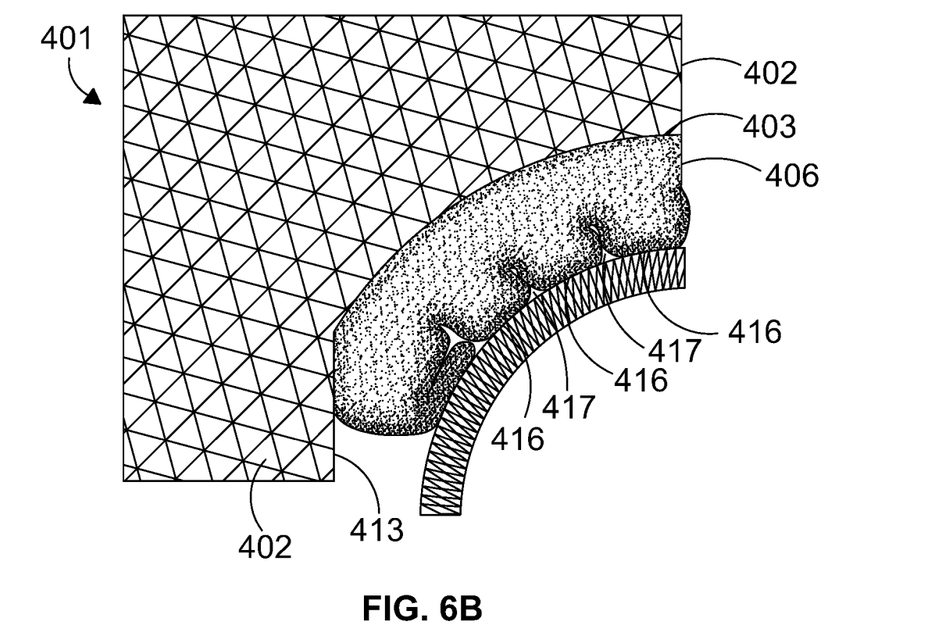

A further embodiment is described in FIGS. 6a and 6b. In this embodiment, the reference numerals are increased by a factor of 400 for ease of reference. In this embodiment the housing 402 of the clamp component 401 is similarly modified as the embodiment shown in FIGS. 5a and 5b described above. Therefore, the outer ends of the surface of the semi-circular channel 403 terminate in straight portions 413 extending perpendicular to the outer ends of the clamp housing.

In this embodiment the inner surface 407 of the resilient body 406 is modified to match at each of the outer ends 408 to follow the change in direction of the semi-circular channel 403 from arcuate to linear portions. However, in this embodiment the ends of the resilient body 406 are truncated and do not extend fully along the linear portion 413 of the seat 404 but terminate before the point where the linear portion 413 meets the outer end of the housing 402.

The outer ends 408 of the resilient body 406 of this embodiment are further modified to provide a flat shoulder 412 at the ends of the outer surface 409. However, unlike the previous embodiment where the flat shoulder led directly into the first trough in the outer surface, in this embodiment the outer surface of the body extends along the flat shoulder 412 but then turns down at a substantially 90 degree angle towards the inner surface 407 of the resilient body before turning back towards the outer ends of the body thus forming an undercut 415 below the flat shoulder 412. From the open end of the undercut, the outer surface 409 is undulated with a series of rounded projections 416 separated by rounded grooves 417. In the embodiment illustrated each of the projections has a similar height from the inner surface 407 of the body although it is envisaged in some embodiments the height of the projections may vary. The height of each projection is less than the height of the ends 408 of the body. Therefore, in this embodiment, as the clamping components are brought into contact with the outer surface of a tubular member, the flat shoulder 412 at the ends of the resilient body initially contact the outer surface of the tubular member.

As the clamp components 401 are pushed against the outer surface of the tubular member, the flat shoulder at the ends of the body are compressed between the ends of the body and the outer surface of the tubular member and spread towards the centre of the resilient body around the tubular member. Further compression of the spring brings the rounded projections 416 into contact with the outer surface of the tubular member and presses the projections such that they deform into the grooves 417. This embodiment provides a significantly improved spring that spreads the load and pressure around the circumference of the tubular member around which the clamping component 401 is mounted from the centre of the component towards the outer ends and thus mitigates the risk of the tubular member collapsing or buckling under the load and pressure of a spring in which the forces may become concentrated towards the centre of the spring.

Figure 7A:
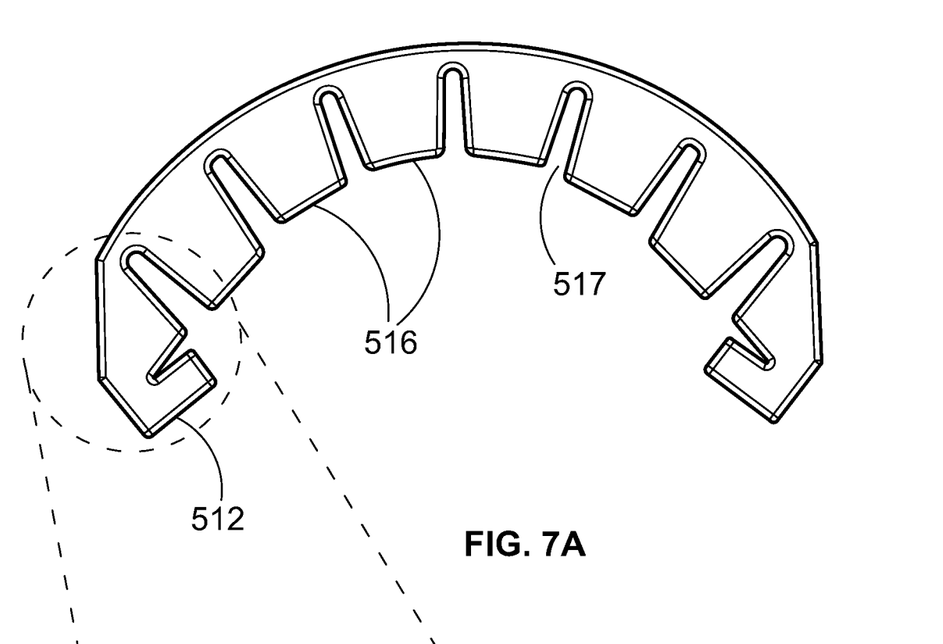
FIG. 7a is a schematic view of a still further alternative embodiment of the present invention.
Figure 7B:
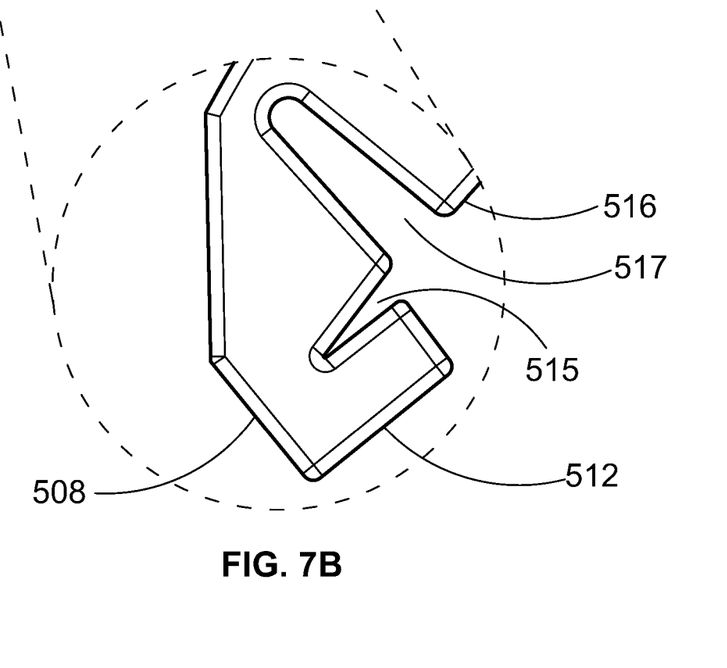

A further embodiment is described in FIGS. 7a and 7b. In this embodiment, the reference numerals are increased by a factor of 500 for ease of reference. In this embodiment the housing 502 of the clamp component 501 is similarly modified as the embodiment shown in FIGS. 6a and 6b described above. Therefore, the outer ends of the surface of the semi-circular channel 503 terminate in straight portions 513 extending perpendicular to the outer ends of the clamp housing.

The outer ends 508 of the resilient body 506 of this embodiment are similarly modified to provide a flat shoulder 512 at the ends of the outer surface 509 and an undercut 515 below the flat shoulder 512.

In this embodiment, the outer surface 509 is formed with a series of frustoconical projections 516 separated by deep rounded grooves 517. The height of the projections varies along the length of the body. In the embodiment shown, the height of the projections at the centre of the body is less than the height of the projections at the ends of the body. In other embodiments, all of the projections may have the same height from the inner surface 507 of the body.

The height of each projection is less than the height of the ends 508 of the body. Therefore, in this embodiment, as the clamping components are brought into contact with the outer surface of a tubular member, the flat shoulder 512 at the ends of the resilient body initially contact the outer surface of the tubular member.

As the clamp components 501 are pushed against the outer surface of the tubular member, the flat shoulder at the ends of the body are compressed between the ends of the body and the outer surface of the tubular member and spread towards the centre of the resilient body around the tubular member. Further compression of the spring brings the frustoconical projections 516 into contact with the outer surface of the tubular member and presses the projections such that they deform into the grooves 517.

As with the embodiment shown in FIGS. 6a and 6b, this embodiment provides a significantly improved spring that spreads the load and pressure around the circumference of the tubular member around which the clamping component 501 is mounted from the centre of the component towards the outer ends and thus mitigates the risk of the tubular member collapsing or buckling under the load and pressure of a spring in which the forces may become concentrated towards the centre of the spring.

Variations of the embodiments described above are also envisaged in which the features affecting stiffness of the spring are combined for example by modifying the embodiment shown in FIGS. 2a and 2b by incorporating the voids of FIGS. 5a and 5b into the spring or modifying the ends of the springs of any of the examples with the ends described in any of the other examples.

As noted above, in each of the embodiments a clamp component is described with a housing and a spring member mounted within a seat in the housing. It will of course be clear to the skilled person that any of the embodiments described could be incorporated into a clamp upon which a buoyancy module is mounted or alternatively integrally formed within a buoyancy module such that the housing of the clamp component would be replaced by a suitable shaped portion of the buoyancy module itself.

A spring as described in relation to any of the embodiments above may be retro fitted to current buoyancy modules by replacing the original springs described in relation to prior art devices with a modified spring according to the present invention. This provides a cost effective way of providing the advantages of the present invention to existing stock of buoyancy modules.

Each of the embodiments described above may be mechanically secured to the clamp components via securing screws or washers. Apertures and/or cavities may be provided through the ends of the resilient body and or along the length of the body. Alternatively, the springs may be directly bonded to the clamp components, for example using an adhesive. In this case, apertures and/or cavities would not be required.

Embodiments as described above may be modified by increasing or decreasing the number of projections based on the required circumferential length of the springs due to changing outer diameters of tubular members. Furthermore, the overall thickness, width and length of the springs may be modified.

It will be appreciated by the skilled person that the present invention provides an improved solution in relation to distribution of the contact pressure between the segments of a multi body clamp and a tubular member such as a riser, umbilical, pipe or the like. This mitigates against collapse of the tubular member due to uneven distribution of the pressure where concentration of the pressure could potentially lead to crushing of the tubular member.

The present invention provides a cost effective solution whereby the contact pressure is more evenly distributed around the outer surface of the tubular member.

By reducing peak pressures, the size i.e. the weight and uplift of offshore clamped equipment can be increased beyond convention values.

What is claimed is:

1. A spring for a clamp suitable for attachment to a tubular member, the spring comprising a resilient body having first and second ends and an internal surface adapted to seat within a clamp member and an external surface adapted to contact an outer surface of the tubular member, the internal and external surfaces extending between the first and second ends and wherein a stiffness of the resilient body of the spring varies over a length of the body between the first and second ends, and the stiffness is higher towards the first and second ends of the resilient body than in a center of the body.

2. A spring according to claim 1, wherein the body of the spring is arcuate.

3. A spring according to claim 1, wherein the stiffness of the body varies gradually from the first and second ends towards the center of the body.

4. A spring according to claim 1, wherein the outer surface of the body is undulating in form.

5. A spring according to claim 4, wherein the outer surface of the body comprises a plurality peaks and troughs along the outer surface of the spring.

6. A spring according to claim 5, wherein the peaks on the outer surface of the spring each have the same height relative to the adjacent trough.

7. A spring according to claim 5, wherein the height of the peaks on the outer surface of the spring relative to the adjacent tough vary along the length of the spring.

8. A spring according to claim 7, wherein the height of the peaks on the outer surface of the spring closest to the center of the spring relative to the adjacent toughs is higher than the height of the peaks closer to the first and second ends of the spring relative to the adjacent troughs.

9. A spring according to claim 1, wherein voids are formed in the body.

10. A spring according to claim 9, wherein the voids have different volumes and or shapes over the length of the spring between the first and second ends.

11. A spring according to claim 10, wherein the voids adjacent the first and second ends of the spring are smaller in volume and or size than the voids closer to the center of the spring.

12. A spring according to claim 1, wherein the resilient body comprises rubber.

13. A spring according to claim 12, wherein the resilient body comprises nitrile rubber.

14. A spring according to claim 1, wherein the resilient body comprises polyurethane.

15. A spring according to claim 1, wherein the resilient body comprises fibre re-enforced plastics.

16. A clamp component for attachment to a tubular member, the clamp component comprising a housing and a spring according to claim 1 mounted within a seat on an inner face of the housing.

17. A clamp according to claim 16, wherein the clamp body comprises a plurality of clamp components, each of which has housing and a spring member mounted thereon.

18. A clamp comprising a plurality of clamp components according to claim 17 and tensioning means for securing said components around a tubular member.

19. A clamp according to claim 18, wherein the tensioning means comprises a band surrounding the clamp.

\* \* \* \* \*